US012744357B2

(12) United States Patent
Lewis et al.

(10) Patent No.: US 12,744,357 B2
(45) Date of Patent: Sep. 22, 2026

(54) CONTROLLED EXTRACTION OF ELECTRONIC CONNECTOR FROM ELECTRONIC CONNECTOR BOARD

(71) Applicant: International Business Machines Corporation, Armonk, NY (US)

(72) Inventors: Theron Lee Lewis, Rochester, MN (US); Timothy P. Younger, Rochester, MN (US); David J. Braun, St. Charles, MN (US); James D. Bielick, Pine Island, MN (US); John R. Dangler, Rochester, MN (US); Stephen Michael Hugo, Stewartville, MN (US); Timothy Jennings, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 18/057,418

(22) Filed: Nov. 21, 2022

(65) Prior Publication Data

US 2024/0170903 A1 May 23, 2024

(51) Int. Cl.
*B23P 19/00* (2006.01)
*H01R 43/20* (2006.01)

(52) U.S. Cl.
CPC .................................. *H01R 43/205* (2013.01)

(58) Field of Classification Search
CPC .............................. H01R 43/205; H01R 43/26
See application file for complete search history.

(56) References Cited

U.S. PATENT DOCUMENTS 4,589,585 A 5/1986 Long, Jr.
4,619,495 A 10/1986 Sochor
(Continued)

FOREIGN PATENT DOCUMENTS

JP 11126664 A 5/1999
WO 2018106500 A1 6/2018

OTHER PUBLICATIONS

Amphenol TCS, "TB-2072 | VHDM® Daughtercard Power Module Replacement Procedure", Revision "D", Copyright © Amphenol Corporation 2005-2008, 6 pages, <https://cdn.amphenol-icc.com/media/wysiwyg/files/documentation/tb2072.pdf>.
(Continued)

*Primary Examiner* — Paul D Kim
(74) *Attorney, Agent, or Firm* — Michael A. Petrocelli

(57) ABSTRACT

A controlled extraction of an electronic connector from an electronic circuit board includes a press mechanism of a device positioned in spaced relation over a base fixture of the device. The base fixture receiving an electronic circuit board which includes a connector. Shafts of a removal tool of the press mechanism can be inserted into a series of openings in the connector, respectively, in response to applying a downward force to the press mechanism. A capturing element on each of the shafts can be actuated where the capturing element couples to a wall defining the opening of each of the openings. The connector can be removed from the electronic circuit board by applying an upward force to the press mechanism which removes the connector with the capturing element of the shafts coupled to the wall of the opening, and releasing the press mechanism from the base fixture.

2 Claims, 15 Drawing Sheets

(56) References Cited

U.S. PATENT DOCUMENTS

| | | | | |
|---|---|---|---|---|
| 6,409,526 | B1 * | 6/2002 | Malone | H01R 13/621 439/75 |
| 6,537,082 | B2 * | 3/2003 | Hopfer, III | H01R 12/62 439/493 |
| 6,775,873 | B2 * | 8/2004 | Luoma | E03C 1/302 15/104.001 |
| 7,017,259 | B2 * | 3/2006 | Aoki | H01R 12/585 29/739 |
| 7,377,028 | B2 * | 5/2008 | Hasircoglu | H01R 43/26 29/757 |
| 7,942,707 | B2 | 5/2011 | Orris | |
| 8,099,863 | B2 | 1/2012 | Chang | |
| 10,683,648 | B2 | 6/2020 | Beck | |
| 11,118,878 | B2 | 9/2021 | Albanese | |
| 2006/0160642 | A1 | 7/2006 | Sullivan | |
| 2014/0325836 | A1 | 11/2014 | Cloer | |

OTHER PUBLICATIONS

Becerra, et al., "Press Fit Technology Roadmap and Control Parameters for a High Performance Process", SMTnet, Technical Library, Published Oct. 27, 2016 , 39 pages, <https://smtnet.com/library/index.cfm?fuseaction=view_article&article_id=2334&company_id=40475>.

Sodhi, et al., "Use of Snap-Fit Fasteners in the Multi-Life-Cycle Design of Products", Proceedings of the 1999 IEEE International Symposium on Electronics and the Environment (Cat. No. 99CH36357), May 13, 1999, pp. 160-165, <https://ieeexplore.ieee.org/document/765869>.

Teradyne, "TB-2046 | VHDM® Backplane Power Insulator Replacement Procedure", Revision "C", Copyright © Teradyne, Inc. 2004, 5 pages.

Teradyne, "TB-2101 | Stacker Rework", Revision "B", Copyright © Teradyne, Inc. 2002, 5 pages.

* cited by examiner

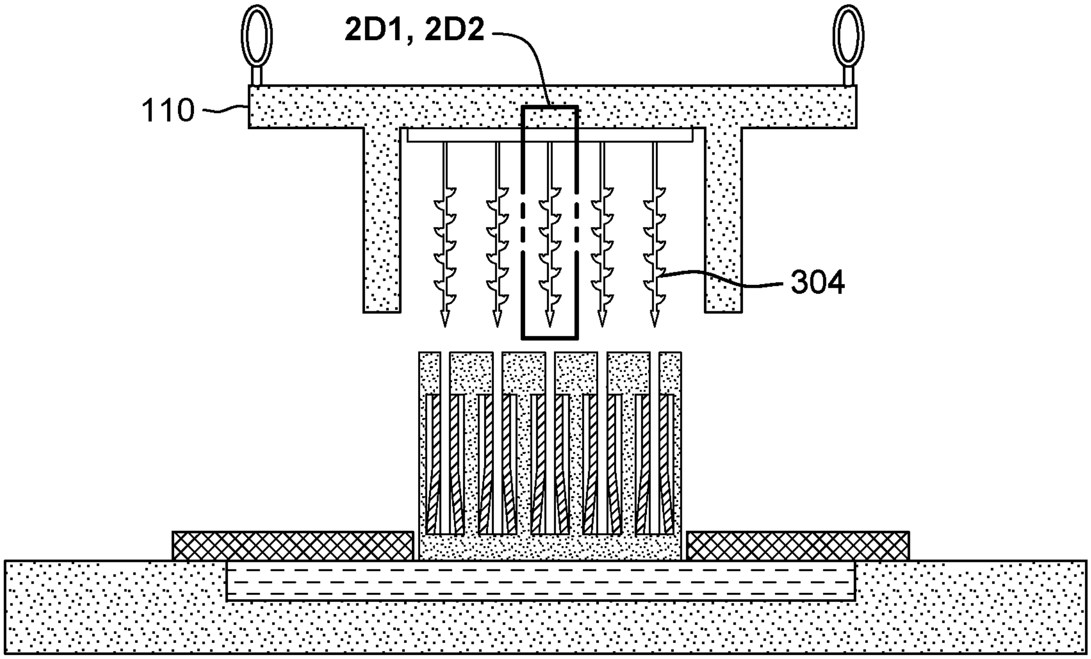
FIG. 2C
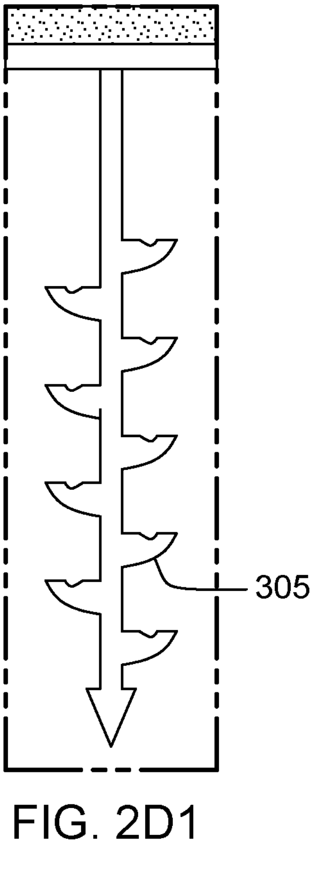
FIG. 2D1
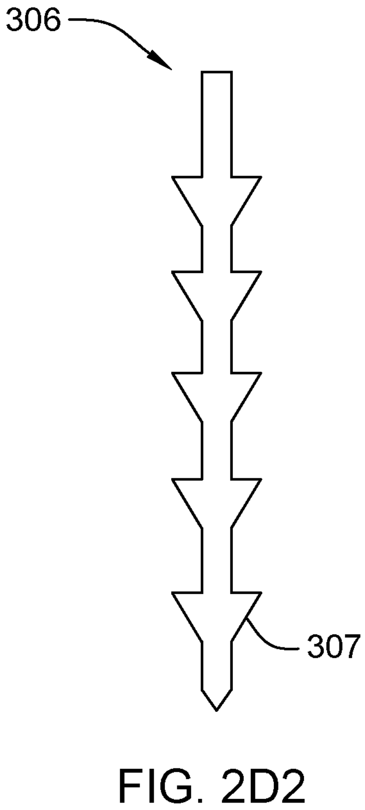
FIG. 2D2

CONTROLLED EXTRACTION OF ELECTRONIC CONNECTOR FROM ELECTRONIC CONNECTOR BOARD

BACKGROUND

The present disclosure relates to techniques for controlled extraction of an electronic connector from an electronic connector board, such as on a printed circuit board assembly (PCBA).

In one example, vertical receptacle compliant pin connectors can be challenging to rework as, for example, pins can be shorter than the thickness of the card or printed circuit board, so they cannot be pushed out from a reverse side. In this situation, a plastic housing can be removed by hand, often taking some, but not all, of the pin contacts with it. Many types of connectors are designed to have the plastic housing easily separated from the metal contacts. However, in one example, the remaining contacts may need to be removed, often individually, and can be removed by hand with a pliers-type tool which can result in lateral strain to occur during removal. This can raise the risk of damage to the circuit board. Further, the length of time and physical manipulations needed to rework a connector can increase the risk of damaging the circuit board assembly.

SUMMARY

The present disclosure recognizes the shortcomings and problems associated with current techniques for controlled extraction of an electronic connector from an electronic connector board, such as on a printed circuit board assembly (PCBA).

Embodiments according to the present invention can include techniques to remove the housing and all contacts at the same time. Such techniques can reduce the number of steps and total time needed to rework a connector, which can reduce the risk of damaging the circuit board assembly.

Embodiments of the present invention include a method and tooling operation to remove compliant/press-fit pin vertical receptacle connector systems. More specifically, individual attributes can engage internally each of the separable interfaces of the connector system. This enables a separable interface mechanism which can be for a fastening mechanism. In one example, a connector can be removed in one controlled extraction, thereby providing a time savings by avoiding removing the housing first and then followed by a single pin removal. Thereby, the amount of handling is reduced and individual hand tools are avoided which card damage and risk to operator injuries. A controlled extraction can minimize the stresses and forces that can occur during an extraction process. Embodiment of the present disclosure can minimized angle/torsional movement during extraction. In one example, individual barbs can be actuated in each of mating windows through a cam mechanism of force which allows the barbs to hook/capture internal metal/plastic features in the connector system. In another example, individual pins with multiple barbs can cause an interference fit. In another example, pins can elastically deform on insertion and can be rigid on extraction. In another example, a cam mechanism is not used, and actuation can include a press technique for insertion. A base fixture, various locking mechanisms, and top plate/locking mechanism can be used in one example, and other examples can include using stainless steel or equivalent to ensure the fixturing does not warp during extraction and still provides support. Fixturing can be milled out to support different components on the PCBA. Removal forces can be applied by using controlled force/deflection equipment or a specialized actuating fixture can be applied.

In an aspect according to the present invention, a method for controlling an extraction of an electronic connector from an electronic circuit board includes positioning a press mechanism of a device in spaced relation over a base fixture of the device. The base fixture has a location for coupling an electronic circuit board including a connector removable coupled to the electronic circuit board. The method includes inserting shafts of a removal tool of the press mechanism into a series of openings in the connector, respectively, in response to applying a downward force to the removal tool. The method includes actuating capturing elements on each of the shafts using the press mechanism, and the capturing elements couple to a wall defining the opening for a plurality of the openings. The method includes removing the connector from the electronic circuit board by applying an upward force to the press mechanism to remove the connector with the capturing element of the shafts coupled to the wall of the opening.

In a related aspect, the method can further include coupling the press mechanism to the base fixture, and releasing the press mechanism from the base fixture when initiating the removal of the connector from the electronic circuit board.

In a related aspect, the press mechanism can be positioned above the removal tool and in contact with the removal tool and is mechanically operable to actuate the capturing elements.

In a related aspect, the removal tool can be positioned in contact with a top surface of the connector for initiating the actuating of the capturing elements using a downward force on the top surface, and the top surface is distal from the capturing elements.

In a related aspect, the connector and the press mechanism can be removed as a unit.

In a related aspect, the press mechanism can be positioned along a parallel plane to the base fixture.

In a related aspect, the method can further include; before actuating the capturing element, initiating the coupling of the press mechanism to the base fixture; and before the removing of the connector form the electronic circuit board, releasing the press mechanism from the base fixture.

In a related aspect, the capturing element can include an actuable barb on the shaft, and the shaft being deformable; and the method can further include the actuating of the capturing element including actuating the barbs on the shafts by the downward force on the press fixture which actuates the barbs on the shafts in response to deforming the shafts with downward pressure from the downward force on the press fixture.

In a related aspect, the removal tool can be in spaced relation to the connector, and the shafts of the removal tool being elongated and being aligned for insertion into the series of openings, respectively.

In a related aspect, the elongated shafts are deformable.

In a related aspect, the capturing elements are removably coupled to the walls defining the openings.

In a related aspect, the upward force is applied along a perpendicular axis to a plane defined by the base fixture.

In a related aspect, the method can further include actuating locking brackets as at least part of the coupling of the press mechanism to the base fixture.

In a related aspect, the capturing element can be an actuable barb on the shaft; and the method can further include the actuating of the capturing element including actuating the barbs on the shafts in response to an actuation mechanism operatively coupled to the press fixture.

In a related aspect, the barbs can be actuated by a cam mechanism.

In a related aspect, the method can further include a computer system managing the controlling of the extraction of the electronic connector from the electronic circuit board by executing instructions, stored on a computer readable medium, for the positioning of the press mechanism, the inserting of the shafts, the actuating of the capturing element, and the removing of the connector.

In a related aspect, the method further includes generating a digital model, using the computer, the digital model simulating the functions of; the positioning of the press mechanism; the inserting of the shafts; the actuating of the capturing element; and the removing of the connector.

In a related aspect, the method further including iteratively generating the digital model to produce updated models.

In another aspect according to the present invention, an apparatus for a controlled extraction of an electronic connector from an electronic circuit board includes a device including a press mechanism being positionable in spaced relation to a base fixture of the device. The press mechanism is couplable to the base fixture, and the base fixture has a location to couple an electronic circuit board including a connector removable coupled to the electronic circuit board, and the connector having a series of opening for receiving electrical connecting pins, the device being couplable to the base fixture. The press mechanism has a removal tool being couplable to the base fixture, and the removal tool is in spaced relation to the connector, and the removal tool has elongated shafts alignable for insertion into the series of openings, respectively. The shafts are insertable into the openings in response to applying a downward force to the removal tool. The apparatus include capturing elements on the shafts being actuable to removably couple the capturing elements to a wall defining the openings of a plurality of the series of openings while removably coupling the removal tool to the base fixture, to remove the connector from the PCBA in response to applying an upward force to the removal tool.

In a related aspect, the capturing elements are actuable using a press mechanism positioned above the removal tool and contactable with the removal tool to actuate the capturing elements.

In another aspect according to the present invention, a system for controlling an extraction of an electronic connector from an electronic circuit board can include a computer system. The computer system can include a computer processor, a computer-readable storage medium, and program instructions stored on the computer-readable storage medium being executable by the processor, to cause the computer system to perform the following functions to: position a press mechanism of a device in spaced relation over a base fixture of the device, the base fixture having a location for coupling an electronic circuit board including a connector removable coupled to the electronic circuit board; insert shafts of a removal tool of the press mechanism into a series of openings in the connector, respectively, in response to applying a downward force to the removal tool; actuate capturing elements on each of the shafts using the press mechanism wherein the capturing elements couple to a wall defining the opening for a plurality of the openings; and remove the connector from the electronic circuit board by applying an upward force to the press mechanism to remove the connector with the capturing element of the shafts coupled to the wall of the opening.

In another aspect according to the present invention, a method for controlling an extraction of an electronic connector from an electronic circuit board can include removing press fit pins in a vertical receptacle connector system for printed circuit boards (PCB) and printed circuit board assemblies (PCBA). The method can include positioning a press mechanism of a device in spaced relation over a base fixture of the device, and the base fixture has a location for coupling an electronic circuit board, the electronic circuit board including a connector removably coupled to the electronic circuit board, the connector has a series of openings for receiving electrical connection pins, and a device including a press fixture in spaced relation over the base fixture and the device being couplable to the base fixture and the press mechanism having a removal tool, the removal tool being in spaced relation to the connector, and the removal tool having elongated deformable shafts being aligned for insertion into one or more of the series of openings, respectively. The method can include inserting shafts of a removal tool into the series of openings, respectively, in response to applying a downward force to the press mechanism, and coupling the device to the base fixture. The method includes actuating a capturing element on each of the shafts wherein the capturing elements couple to a wall defining the opening of each of the openings. The method includes removing the connector from the electronic circuit board by applying an upward force to the press mechanism which removes the connector with the capturing element of the shafts coupled to the wall of the opening after releasing the press mechanism from the base fixture.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 2C is a side elevational view of the apparatus including a removal tool having features being inserted into the connector.

FIG. 2D1 is a detailed view of the feature having a first type of barb.

FIG. 2D2 is a detailed view of the feature having a second type of barb.

DETAILED DESCRIPTION

Figure 1A:
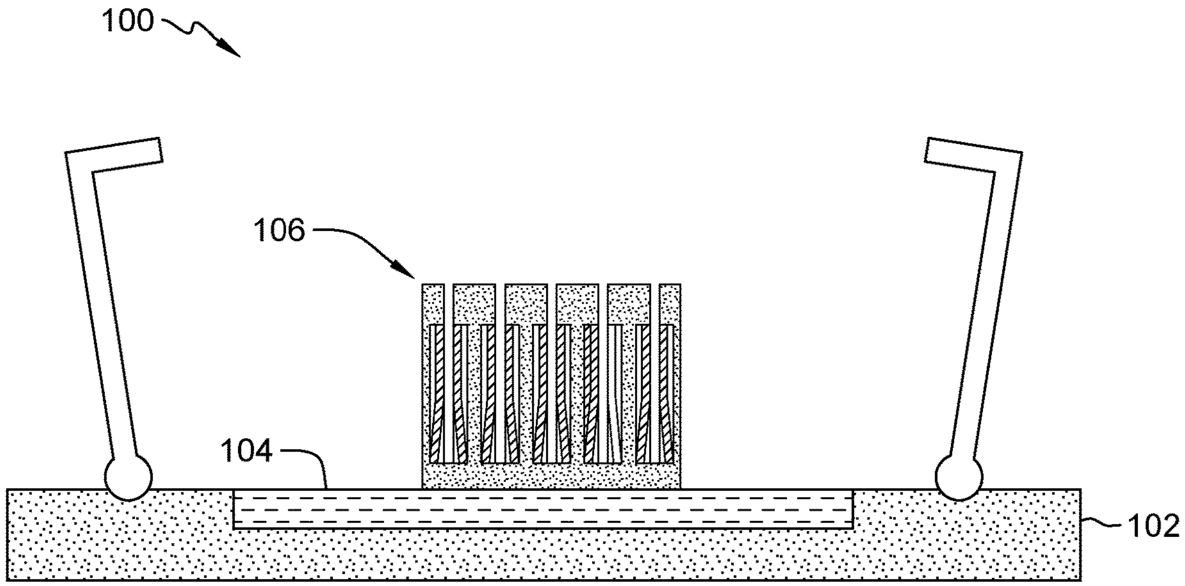
FIG. 1A is a side elevational view of an apparatus which includes a base, printed circuit board, and an electronic connector removably coupled to the board, as part of a system, according to an embodiment of the present disclosure, for controlling an extraction of an electronic connector from an electronic circuit board.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

In embodiments according to the present disclosure, a method and tooling concept is disclosed to remove compliant/press fit pin vertical receptacle connector systems. Specifically, techniques can use individual attributes that engages internally each of the separable interfaces of a connector system, which introduces separable interface mechanism into a fastening mechanism. Techniques provide a method to remove a connector in one controlled extraction, thus providing a time savings by avoiding removing the housing first and then followed by a single pin removal. Thereby, the amount of handling and individual hand tools is reduced which avoids card damage and risk to operator injuries. The controlled extraction can minimize the stresses and forces which can be measured/modeled during the process. Techniques minimize angle/torsional movement during extraction. In one example, individual barbs are actuated in each of the mating windows through cam mechanism of force which allows the barbs to hook/capture the internal metal/plastic features in the connector system. In another example, individual pins with multiple barbs can cause an interference fit. The pins elastically deform on insertion and are rigid on extraction. No cam mechanism is required for a press to initiate insertion of the pins. On one example, a base fixture, various locking mechanisms, and top plate/locking mechanism are used, and can be stainless steel or equivalent, to ensure the fixturing does not warp during extraction and provides support. Fixturing is milled out to support the different components on the PCBA. Removal forces can be applied by using a controlled force/deflection equipment or a specialized actuating fixture can be applied.

Referring to FIGS. 1A through 1K, according to an embodiment of the present disclosure, a device can be used to control an extraction of an electronic connector from an electronic circuit board. Referring to FIG. 1A, a system 100, and associated method of use/operation, includes a base fixture 102 which receives a printed circuit board assembly (PCBA) 104 which is supported without damaging any components on the PCBA. The PCBA may be placed into the base fixture and the PCBA can include a connector 106. The connector 106 includes openings 107 for receiving pins.

Figure 1B:
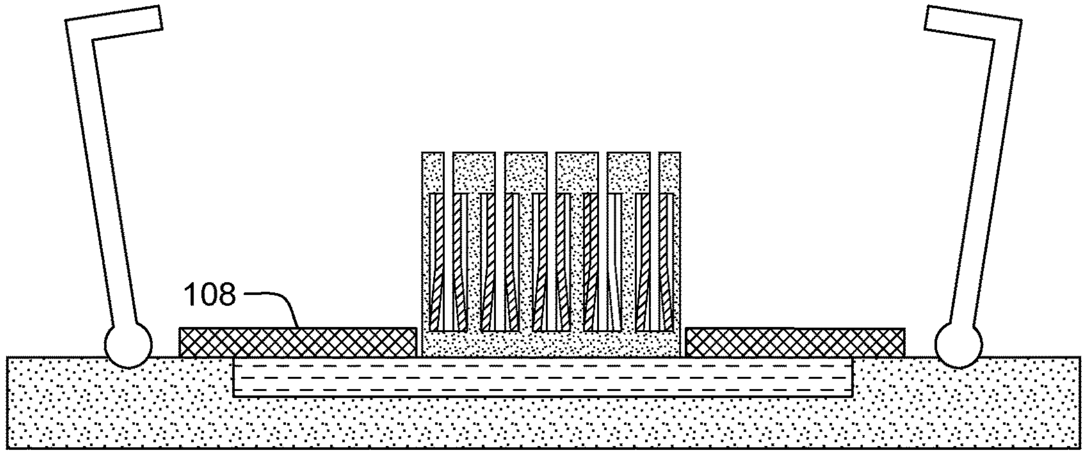
FIG. 1B is a side elevational view of the apparatus in operation including a top plate.

Referring to FIG. 1B, a top plate 108 or a top fixture and/or top surface of a locking mechanism, is attached and can be used to ensure the PCBA is firmly secure to the base fixture. In one example, the locking mechanism can strain relief the PCBA during connector removal process to minimize PCBA flexing.

Figure 1C:
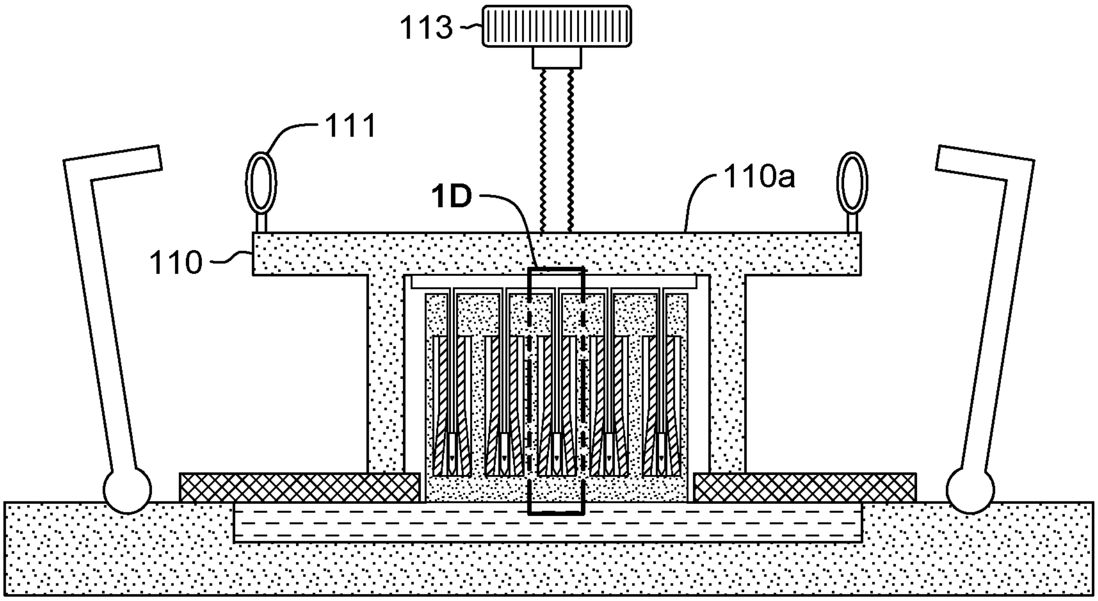
FIG. 1C is a side elevational view of the apparatus in operation including a removal tool.
Figure 1D:
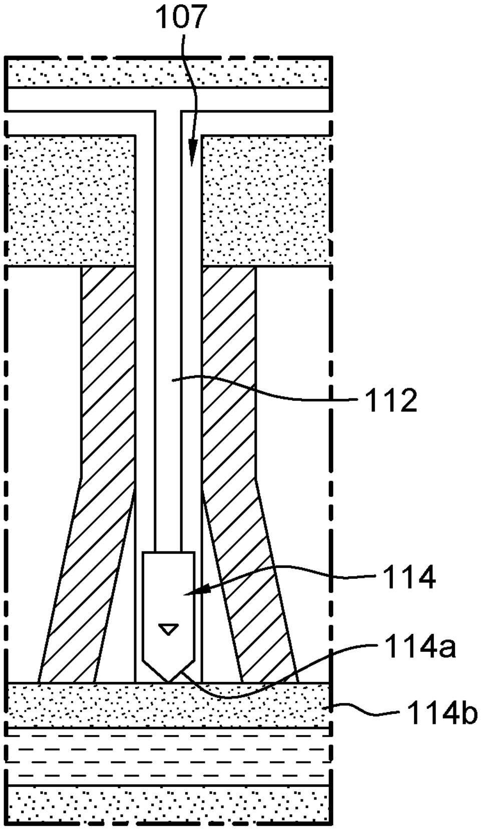
FIG. 1D is a detailed view of a pin and tip of the removal tool, inserted into the connector.

Referring to FIG. 1C, a f tool includes rings 111. The tool has a series of shafts 112 each with an individual feature 114 that engage mating windows or openings 107 of the connector, as shown in detail in FIG. 1D. The individual features 114 can include, in all or in part, pins that have unactuated barbs in them. The removal tool 110 locking mechanism includes a force knob 113 that causes barbs from the features to be actuated within the connector. The mechanism includes a force plate 110*a* where the plate pushes the pins or shafts 112 into the connector and the tips 114*a* of the pins or shafts 112 actuate the barbs, for example, when the tips contact a base 114*b*.

Figure 1E:
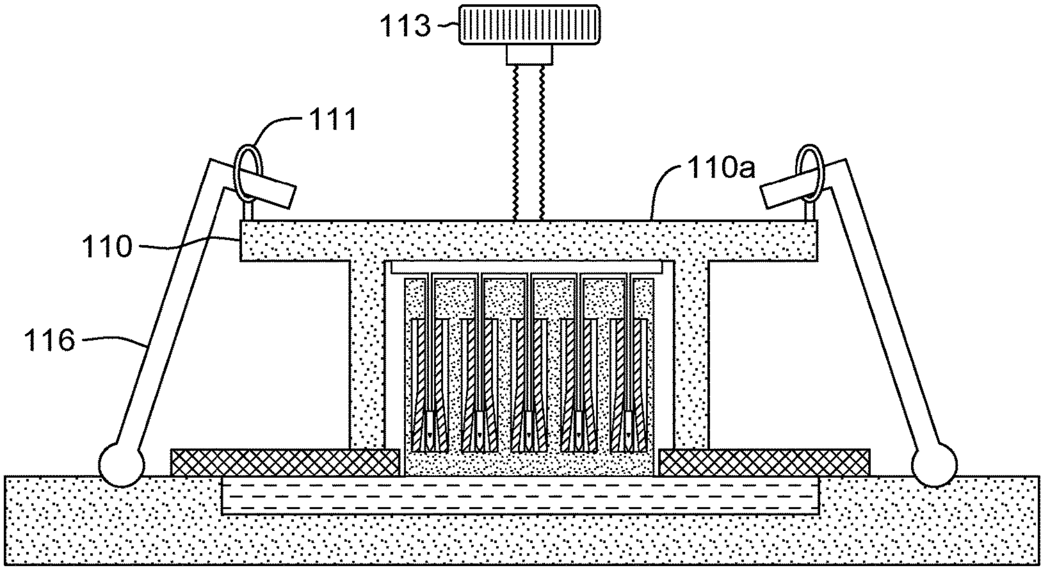
FIG. 1E is a front elevational view of the apparatus in operation having brackets connected to the base fixture in a coupled or connected position.

Referring to FIG. 1E, the system includes using a locking bracket 116 connected to the base fixture 102 to connect the removal tool to the base fixture with the connector coupled to the removal tool. The pins are in the connector and are in an unactuated position. The brackets 116 removable couple the removal tool to the base.

Figure 1F:
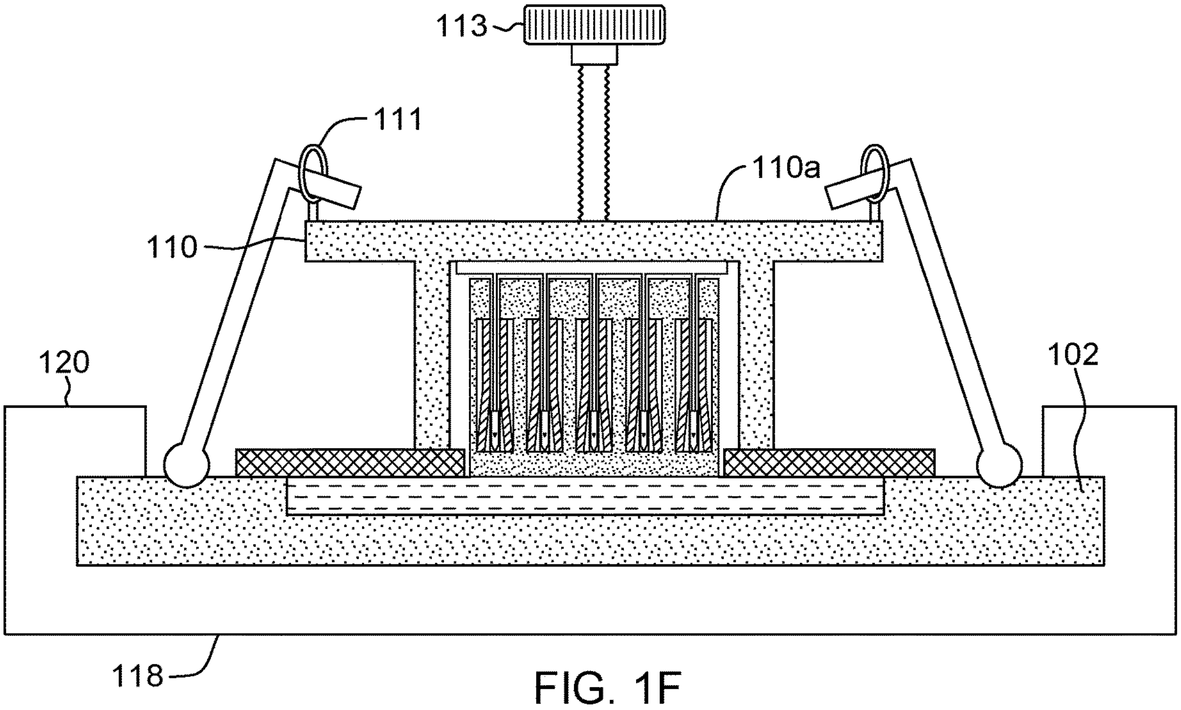
FIG. 1F is a front elevational view of the apparatus in operation where the base fixture is positioned in a tabletop surface and includes a locking mechanism.

Referring to FIG. 1F, in one example, the base fixture 102 can be clamped or locked to a tabletop surface 118 using a locking mechanism 120.

Figure 1G:
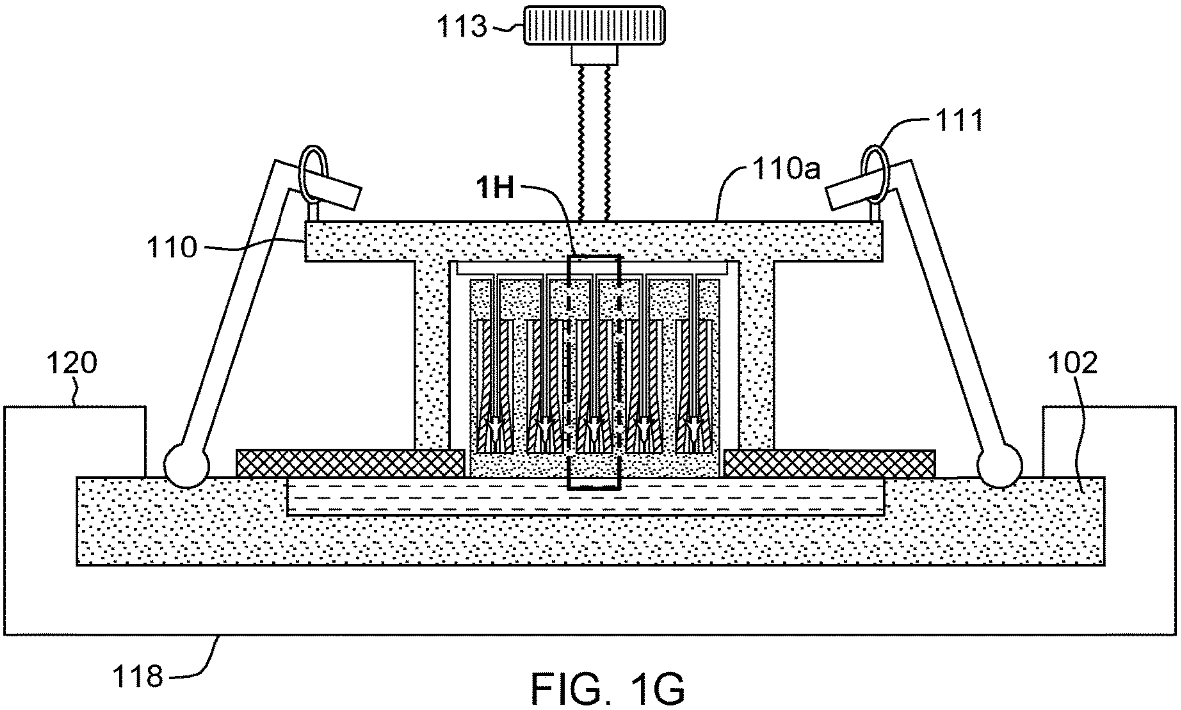
FIG. 1G is a front elevational view of the apparatus in operation where an actuation knob can actuate a barb on a pin.
Figure 1H:
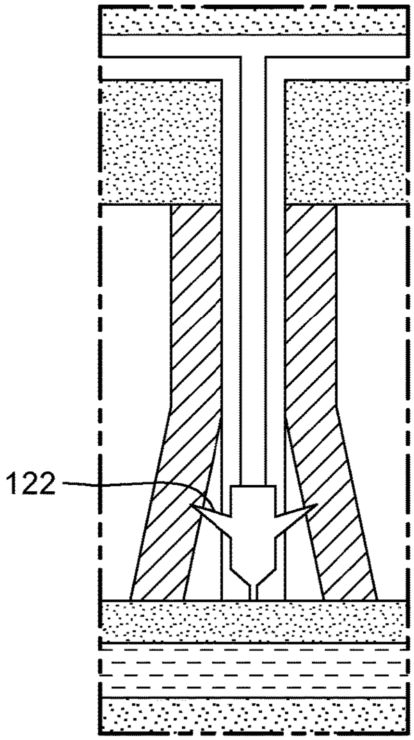
FIG. 1H is a detailed view of the pin and tip of the removal tool having a barb actuated.

Referring to FIGS. 1G and 1H, the system includes barbs 122 of the individual pins 112 being actuatable by turning the force knob 113. In one example, the system includes initiating the knob 113 to actuate the barbs 122. The barbs 122 of the features 114 are actuated inside one or more of the apertures or openings 107, respectively, of the connector 106. In FIG. 1H, the barbs 122 are shown in detail in an actuated position inside one of the openings 107 of the connector 106.

Figure 1I:
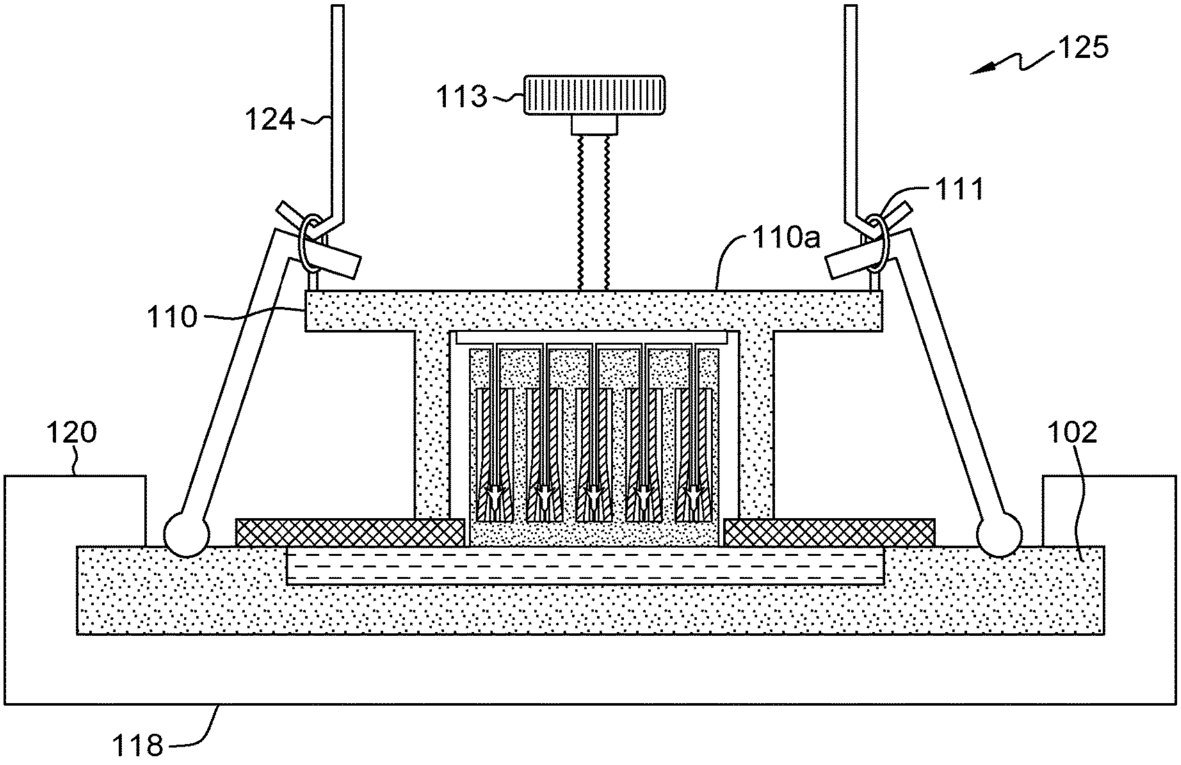
FIG. 1I is a front elevational view of the apparatus in operation depicting pulling features such as hooks capturing rings on the removal tool.

Referring to FIG. 1I, pulling features 124, for example, hooks, are attached to the removal tool by attaching the pulling features 124 to the rings 111. The pulling features can include, for example, hooks to attached to or capture the rings. The assembly of the heretofore described components forms the apparatus 125.

Figure 1J:
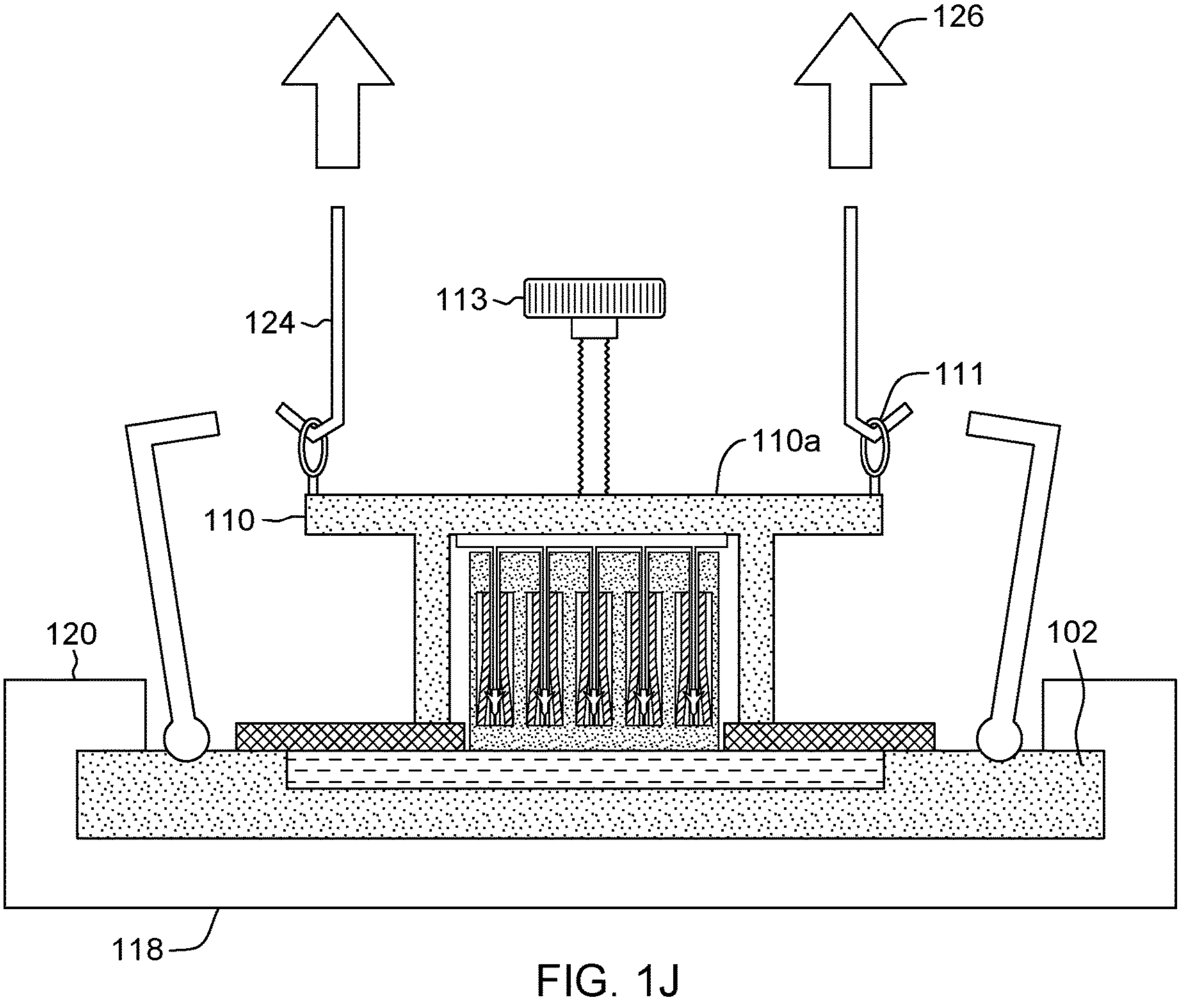
FIG. 1J is a front elevational view of the apparatus in operation depicting upward force applied to the removal tool using the pulling features.

Referring to FIG. 1J, the locking brackets 116 are pivoted away from the tool and thereby release the tool. Thus, the locking brackets are removed/released between the base fixture and the removal tool. The locking brackets removeable coupled the removal tool and the base fixture. Upward force 126 can be applied to the pulling features 124, and thereby apply an upward force to the tool.

Figure 1K:
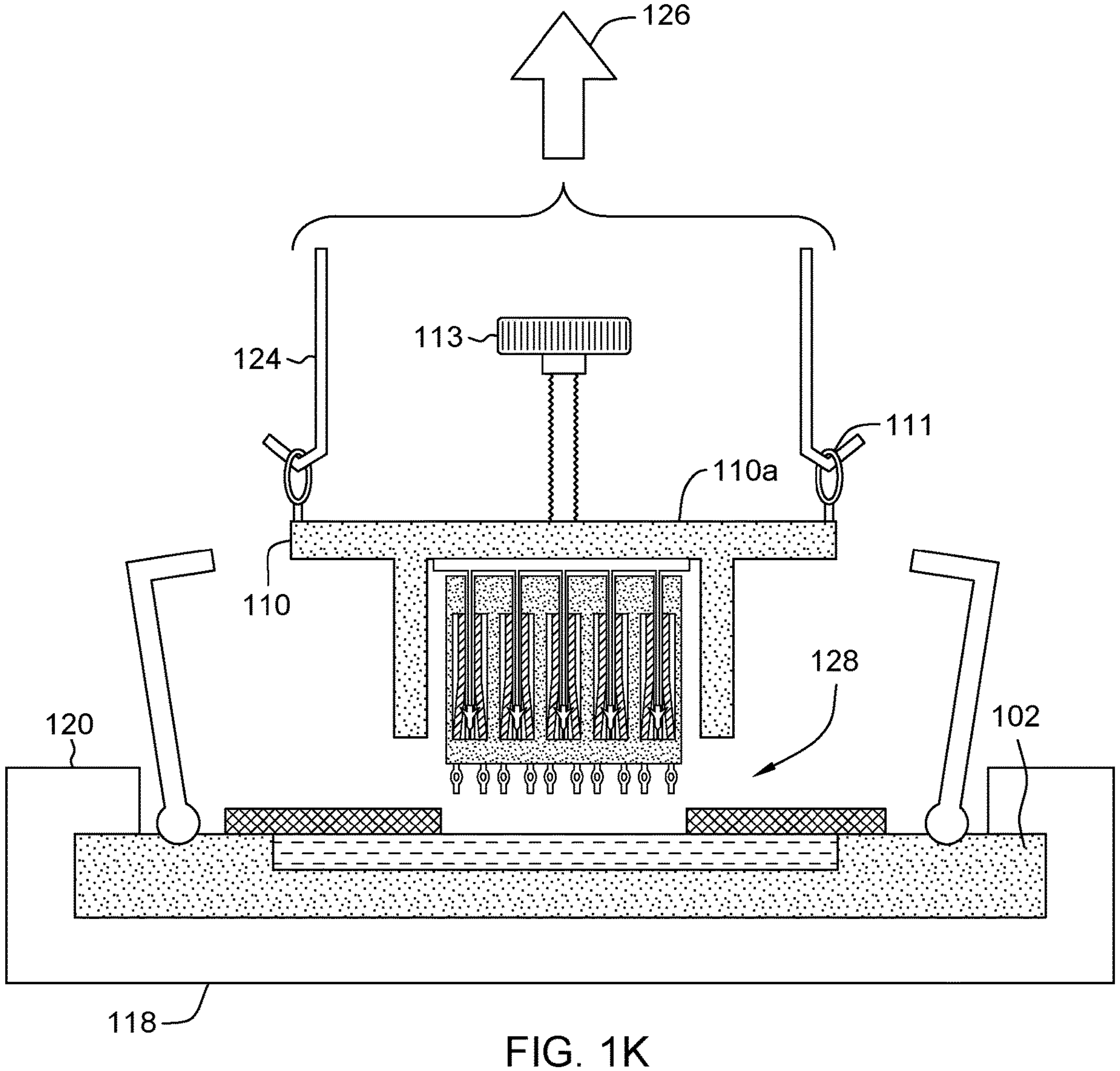
FIG. 1K is a front elevation view of the apparatus in operation depicting removal of the connector using the removal tool.

Referring to FIG. 1K, a controlled extraction of the connector is executed by the upward force 126 using the pulling features 124 to remove or disconnect the connector from the PCBA, which results in a gap or space 128 between the connector and the PCBA. As a result, a new connector can be installed into the PCBA.

Figure 2A:
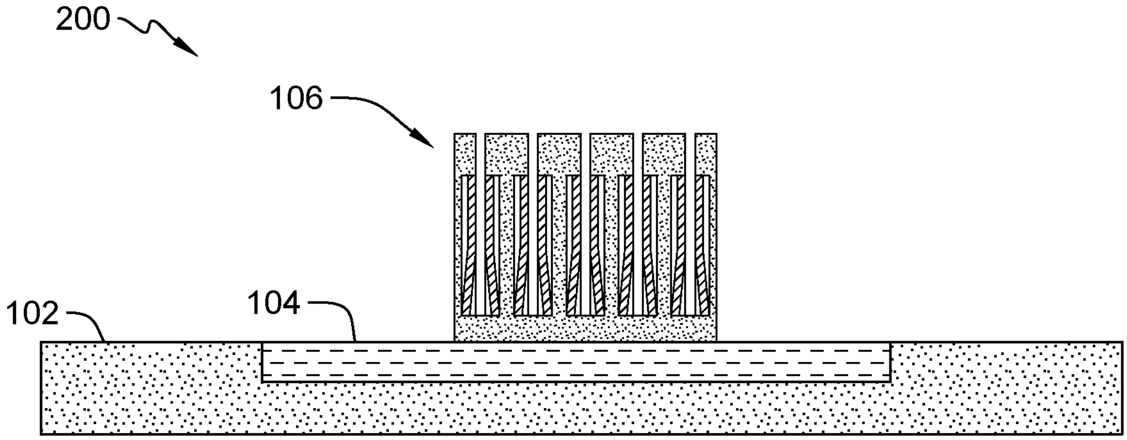
FIG. 2A is a side elevational view of an apparatus which includes a base, printed circuit board, and an electronic connector removably coupled to the board, as part of a system, according to another embodiment of the present disclosure, for controlling an extraction of an electronic connector from an electronic circuit board.

Referring to FIGS. 2A through 2I, according to another embodiment of the present disclosure, another system 300, and associated method of operation, can be used to control an extraction of an electronic connector from an electronic circuit board. Similar components have the same reference numbers as the system 100 shown in FIGS. 1A through 1K. Referring to FIG. 2A, a base fixture 102 has a PCBA 104 supported on the base after placing the PCBA in the base fixture. The PCBA includes a connector 106.

Figure 2B:
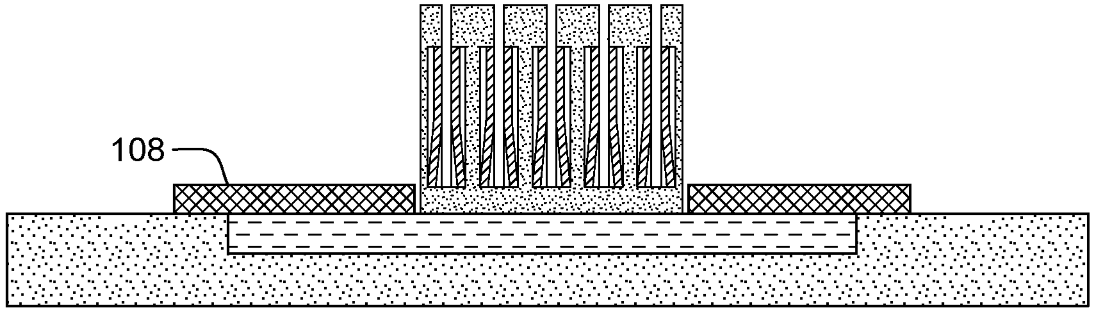
FIG. 2B is a side elevational view of the apparatus including a top plate.

Referring to FIG. 2B a top plate 108 and/or locking mechanism is attached to ensure the PCBA is firmly secured to the base fixture. The locking mechanism can strain relief the PCBA during connector removal process to minimize PCBA flexing.

Referring to FIGS. 2C and 2D1, the system includes a removal tool 110 where the tool has individual features that include pins 304 having barbs 305 on each side of the pins which are off-set. The barbs 305 engage each of mating windows of the connectors. The individual features can be plastic pins that have barbs on each side of pins. The plastic barbs can have ductility to be able to bend during insertion into the connector but be rigid on extraction. The design of the barbs can be specialized for the engagement for the contact and/or connector housing.

For example, the installation of the removal tool can include pins with plastic tines. Each of the pins with barbs can be inserted into the different connector mating windows. Due to the interference of the plastic tines, a press can be used to push the pins into the connector.

Referring to FIG. 2D2, in one example, the removal tool can include individual features that include pins 306 having barbs 307 which are in-line. Other designs for the pins are possible, and the pins can be disposable.

Figure 2E:
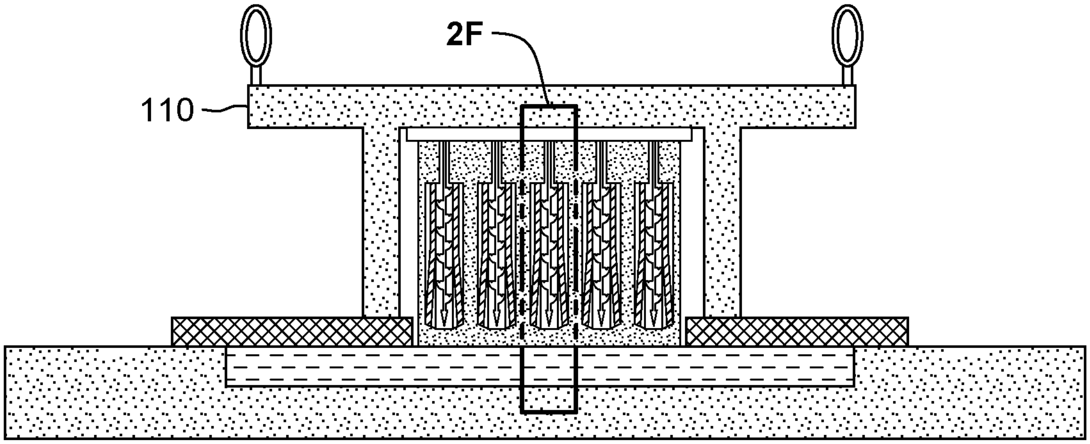
FIG. 2E is a side elevational view of the apparatus with feature of the removal tool inserted into the connector.
Figure 2F:
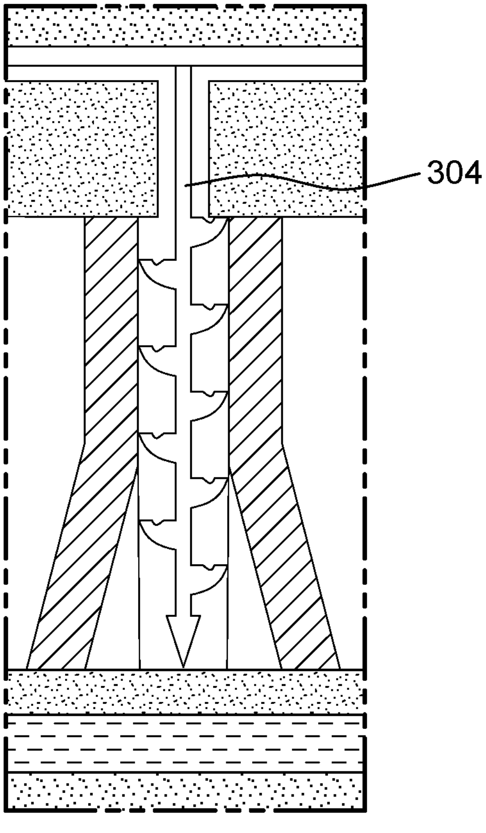
FIG. 2F is a detailed view of the feature depicting the barbs.

Referring to FIGS. 2E and 2F, the removal tool is installed into the connector using the pins, which can require a press to force the plastic pins with barbs to insert into the connector.

Figure 2G:
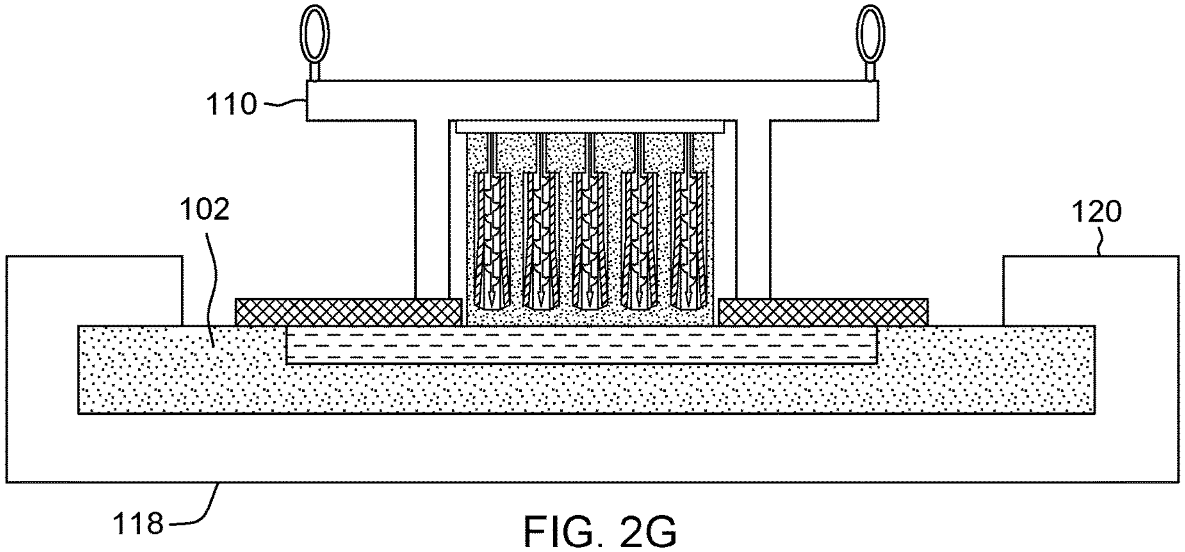
FIG. 2G is a side elevational view of the apparatus including a where the base fixture is positioned in a tabletop surface and includes a locking mechanism.

Referring to FIG. 2G, a locking mechanism 120 clamps/locks the base fixture to a tabletop surface 118.

Figure 2H:
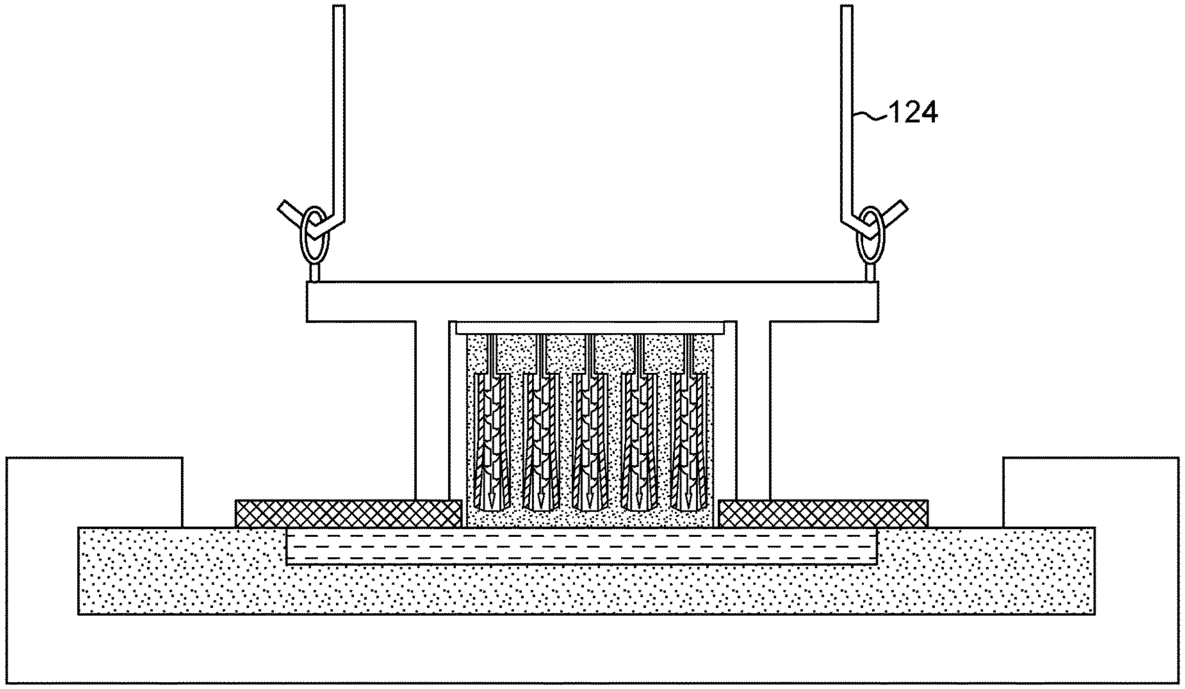
FIG. 2H is a side elevational view of the removal tool of the apparatus being coupled to pulling features.

Referring to FIG. 2H, a controlled extraction of the connector is initiated using hooks and applying an upward force.

Figure 2I:
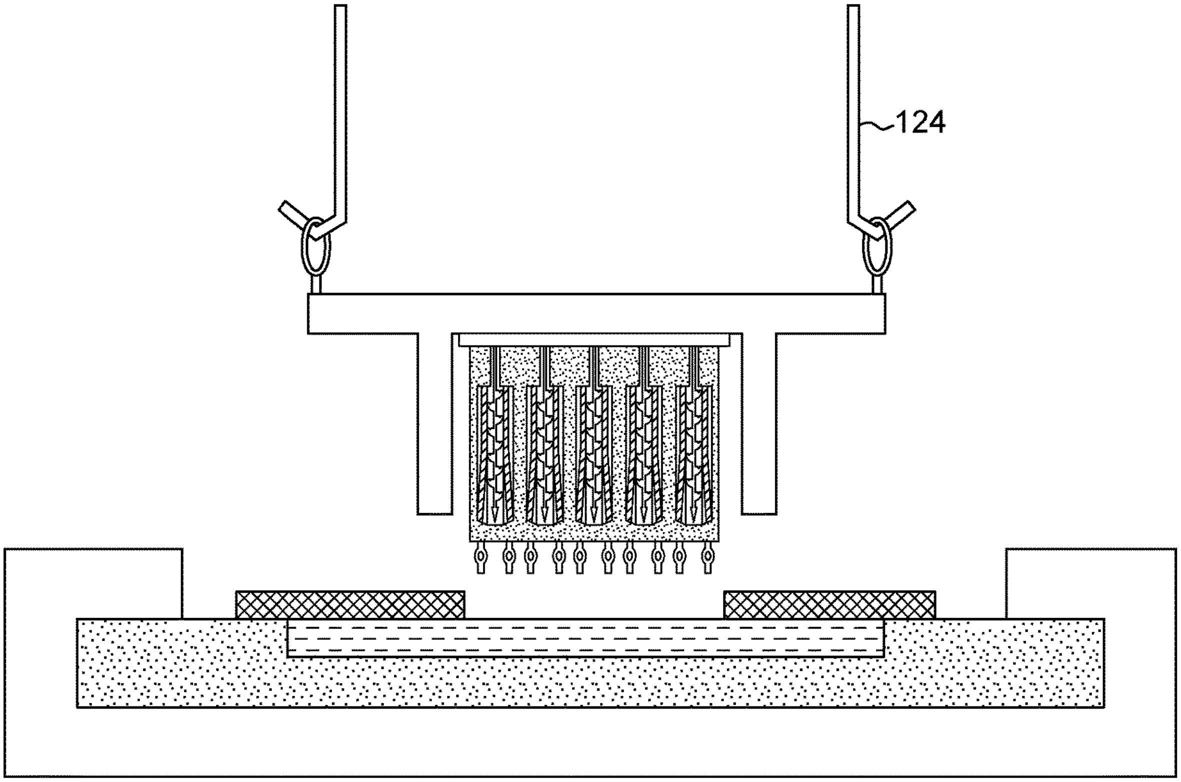
FIG. 2I is a side elevation view of the apparatus depicting the pulling features being used to decouple the connector from the circuit board.

Referring to FIG. 2I, the connector is removed using the removal tool. The barbed pins can be disposed with the connector. The PCBA can receive a new connector for installations once the connector is removed.

Figure 3:
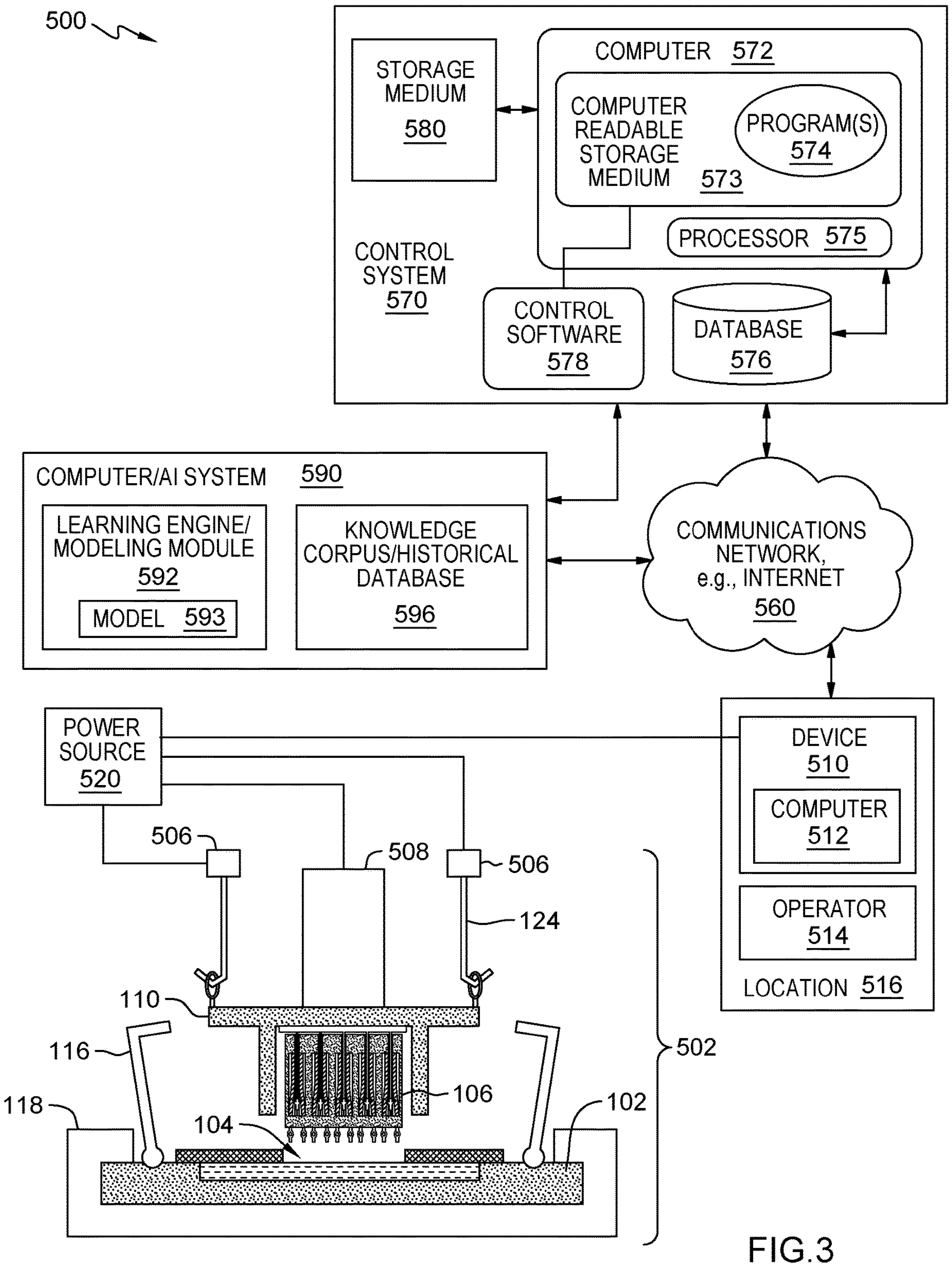
FIG. 3 is a schematic block diagram illustrating, according to an embodiment of the present disclosure, a system for controlled extraction of an electrical connector from an electronic circuit board, the system includes an apparatus used for the extraction and one or more computer systems.
Figure 4:
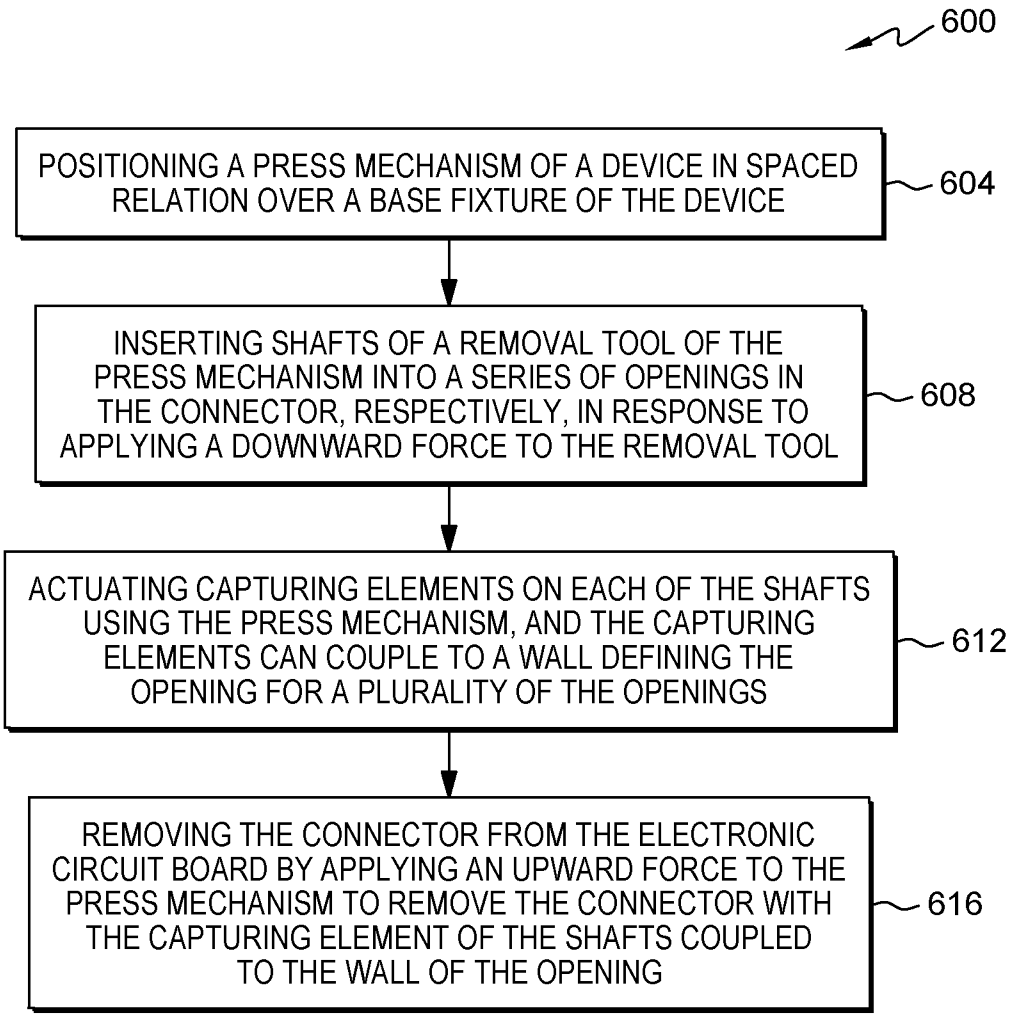
FIG. 4 is a flow chart of a method, according to an embodiment of the present disclosure, which can use the system depicted in FIG. 3, for controlled extraction of an electrical connector from an electronic circuit board.

Referring to FIGS. 3 and 4, a system 500 and a method 600 based on the system, according to the present disclosure, for controlling an extraction of an electronic connector from an electronic circuit board, can include an apparatus 502. The apparatus has some similar components as the system 125 shown in FIG. 1I. The apparatus is one example of a device for controlling an extraction of an electronic connector from an electronic circuit board. The apparatus 502 can communicate with a power source 520. An operator 514 at a location 516 can also manage, in all or in part, operation of the apparatus, using a device 510 having a computer 512. The controlling of the apparatus can include a series of steps or operations, for example, as in the system 100 shown in FIGS. 1A through 1K, which are initiated and implemented, in all or in part, using a computer or artificial intelligence (AI), in one or combinations and/or in all or in part. The computer and/or AI can generate an automated system, in all or in part, for initiating a controlled extraction of an electronic connector from an electronic circuit board.

Figure 5:
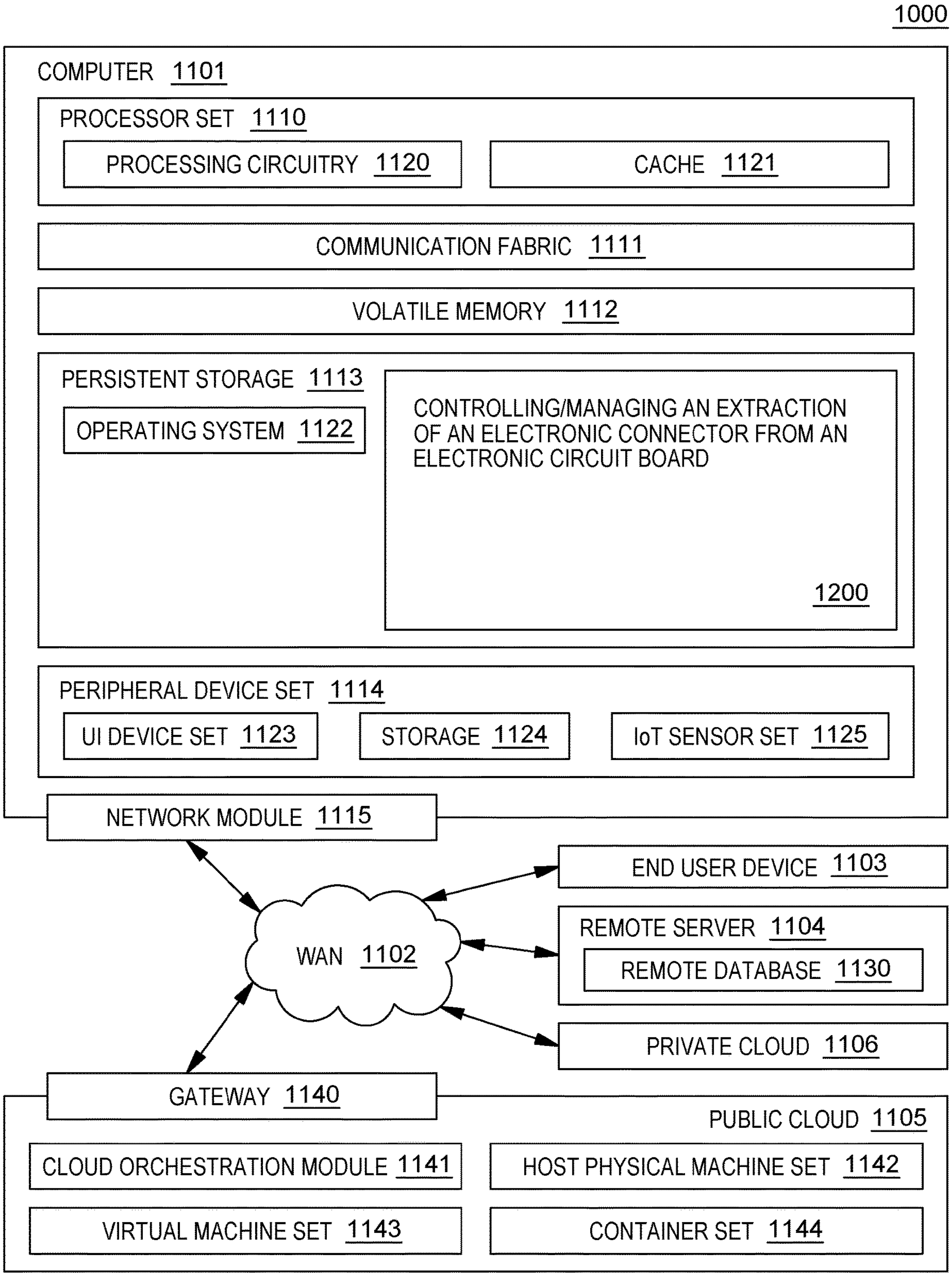
FIG. 5 is a schematic block diagram depicting a computing environment according to an embodiment of the disclosure, which includes cloud computing components and functions, and which can cooperate with the systems and methods shown in the figures and described herein.

A system and/or apparatus can include a motor or electrically generated device, and include or be electrically and communicatively connected to a computer, which can be local to the device or remote. In one example, the computer 572 of the system can communicate with the user device 510 for use by an operator 514 located at a location 516. The device 504 and/or the user device 512 can also communicate with a communications network 560, for example, the Internet. The device 510 can include a computer 512 having components as shown in a computing environment 1000 (FIG. 5). Such devices can communicate with the Internet 560 and communicate with remote computers and data storage devices. In one example, a remote computer/AI (Artificial Intelligence) system 590 and a control system 570 can communicate with the device via the network 560.

In one or more examples, the system 500 can operate as described above, and in another example, the apparatus 502 can be monitored using a computer system to monitor the apparatus and include the controlling of the removal tool and the locking brackets.

Referring to FIGS. 3 and 4, in one embodiment according to the present disclosure, a method 600 for controlling an extraction of an electronic connector 106 from an electronic circuit board 104 can include positioning a press mechanism of a device or apparatus 502 in spaced relation over a base fixture 102 of the device, as in block 604. The press mechanism can be embodied, for example, as a removal tool having a force knob 113 as shown in FIG. 1G, or an electronic actuator 508 as shown in FIG. 3. The base fixture 102 can have a location for coupling the electronic circuit board 104 including the connector 106 which is removable coupled to the electronic circuit board 104.

The method can include inserting shafts 112 of a removal tool 110 of the press mechanism into a series of openings in the connector, respectively, in response to applying a downward force to the removal tool, as in block 608.

The method can include actuating capturing elements on each of the shafts using the press mechanism, and the capturing elements can couple to a wall defining the opening for a plurality of the openings, as in block 612. The capturing elements can be embodied, for example, as barbs 122.

The method can include removing the connector from the electronic circuit board by applying an upward force to the press mechanism to remove the connector with the capturing element of the shafts coupled to the wall of the opening, as in block 616. In one example, an upward force can be applied using electronic actuators 506 applied to pulling features 124. The actuators 506 and actuator 508 communicate with a power source 520 and can be controlled from the device 510.

In one example, the method can include coupling the press mechanism to the base fixture, and releasing the press mechanism from the base fixture when initiating the removal of the connector from the electronic circuit board. In one example, a coupling mechanism can include brackets 116 for coupling the press mechanism to the base fixture. In one example, the brackets can be actuated electronically.

In another example, the press mechanism can be positioned above the removal tool and in contact with the removal tool and is mechanically operable to actuate the capturing elements. In another example, the removal tool can be positioned in contact with a top surface of the connector for initiating the actuating of the capturing elements using a downward force on the top surface, and the top surface is distal from the capturing elements. The downward force, for example, can be delivered by the actuator 508.

In another example, the connector and the press mechanism can be removed as a unit. In one example, the method can include positioning a PCBA (printed circuit board assembly) in a base fixture, and the PCBA can include a connector removably coupled to the PCBA, and the connector can have a series of opening for receiving electrical connecting pins.

In one example, the press mechanism can be positioned along a parallel plane to the base fixture.

In another example, the method can further include before actuating the capturing element, initiating the coupling of the press mechanism to the base fixture, and before the removing of the connector from the electronic circuit board, releasing the press mechanism from the base fixture.

In another example, the capturing element can include an actuable barb on the shaft, and the shaft can be deformable. The method can further include the actuating of the capturing element including actuating the barbs on the shafts by the downward force on the press fixture which actuates the barbs on the shafts in response to deforming the shafts with downward pressure from the downward force on the press fixture.

In another example, the removal tool can be in spaced relation to the connector, and the shafts of the removal tool can be elongated and be in aligned for insertion into the series of openings, respectively.

In another example, the elongated shafts can be deformable. In another example, the capturing elements can be removably coupled to the walls defining the openings. In another example, the upward force can be applied along a perpendicular axis to a plane defined by the base fixture. The method can further include actuating locking brackets as at least part of the coupling of the press mechanism to the base fixture. In another example, the capturing element can be an actuable barb on the shaft, and the method can further include the actuating of the capturing element include actuating the barbs on the shafts in response to an actuation mechanism operatively coupled to the press fixture. In another example, the barbs can be actuated by a cam mechanism.

In another example, the method can include a computer system managing the controlling of the extraction of the electronic connector form the electronic circuit board by executing instructions, stored on a computer readable medium, for the positioning of the press mechanism, the inserting of the shafts, the actuating of the capturing element, and the removing of the connector.

In another example, the method can include generating a digital model, using the computer, the digital model simulating the functions of: the positioning of the press mechanism; the inserting of the shafts; the actuating of the capturing element; and the removing of the connector. In another example, the method can include iteratively generating the digital model to produce updated models.

In another embodiments, a method can further include generating a digital model, using the computer. The digital model can simulate the functions of: the positioning of the press mechanism; the inserting of the shafts; the actuating of the capturing element; and the removing of the connector. The method can further include iteratively generating the digital model to produce updated models.

In another embodiment according to the present disclosure, an apparatus can be used for a controlled extraction of an electronic connector from an electronic circuit board. In one example, an apparatus 502 (FIG. 3) can be used to remove press fit pins in a vertical receptacle connector system for printed circuit boards (PCB) and printed circuit board assemblies (PCBA). The apparatus can include a device including a press mechanism (such as a removal tool 110 and an actuator 508) being positionable in spaced relation to a base fixture of the device, and the press mechanism is couplable to the base fixture 102 (in one example, along a perpendicular plane to the base fixture). The base fixture can have a location to couple an electronic circuit board including a connector removable coupled to the electronic circuit board. The connector can have a series of opening for receiving electrical connecting pins, which can include a device including a press fixture in spaced relation over the base fixture, and the device can be couplable to the base fixture. The press mechanism can be coupled to a removal tool being couplable to the base fixture, and the removal tool can be in spaced relation to the connector. The removal tool can have an elongated and can be deformable shafts which can be alignable for insertion into a series of openings, respectively. The shafts can be insertable into the openings in response to applying a downward force to the removal tool. For example, the downward force can be initiated by the actuator 508. The apparatus can include capturing elements on the shafts which can be actuable to removably couple the capturing elements to a wall defining the openings of a plurality of the series of openings while removably coupling the removal tool to the base fixture, to remove the connector from the PCBA in response to applying an upward force to the removal tool. For example, the shafts can be embodied as shafts 112 having capturing elements such as barbs 122 to couple to a wall defining the openings.

In one example, the apparatus can include a capturing elements which can be actuable using a press mechanism positioned above the removal tool and contactable with the removal tool to actuate the capturing elements.

In one example, the removal tool can be contactable with a top surface of the connector where the top surface is distal from the capturing elements. In another example, the connector and the press mechanism can be removed as a unit, in response to applying the upward force to the press mechanism.

In another example, the removal tool can be positionable in spaced relation to the connector, and the shafts are alignable for insertion into the series of openings, respectively.

In one embodiment according to the present disclosure, a computer program product for controlling an extraction of an electronic connector from an electronic circuit board can include the following. The computer program product can include a computer readable storage medium having program instructions embodied therewith, the program instructions executable by a computer to cause the computer to perform functions, by the computer, comprising the functions to: position a press mechanism of a device in spaced relation over a base fixture of the device, the base fixture having a location for coupling an electronic circuit board including a connector removable coupled to the electronic circuit board. The product can further include functions to insert shafts of a removal tool of the press mechanism into a series of openings in the connector, respectively, in response to applying a downward force to the removal tool, and to actuate capturing elements on each of the shafts using the press mechanism wherein the capturing elements couple to a wall defining the opening for a plurality of the openings. And the product can include functions to remove the connector from the electronic circuit board by applying an upward force to the press mechanism to remove the connector with the capturing element of the shafts coupled to the wall of the opening.

In one embodiment according to the present disclosure, in operation, a method for controlling an extraction of an electronic connector from an electronic circuit board includes positioning a press mechanism of a device in spaced relation over a base fixture of the device, which can be along a parallel plane to a base fixture, the base fixture having a location for coupling an electronic circuit board, such as a printed circuit board assembly (PCBA). The electronic circuit board including a connector removably coupled to the electronic circuit board, the connector having a series of openings for receiving electrical connection pins. The device can include a press fixture in spaced relation over the base fixture and the device can be couplable to the base fixture and the press mechanism having a removal tool. In one example, the removal tool being in spaced relation to the connector, and the removal tool can have elongated deformable shafts which are aligned for insertion into one or more of the series of openings, respectively. The method can include inserting shafts of a removal tool into the series of openings, respectively, in response to applying a downward force to the press mechanism. The method can include coupling the device to the base fixture. The method can include actuating a capturing element on each of the shafts wherein the capturing elements removably coupled to a wall defining the opening of each of the openings. The method can include removing the connector from the electronic circuit board by applying an upward force to the press mechanism which removes the connector with the capturing element of the shafts coupled to the wall of the opening after releasing the press mechanism from the base fixture.

Other Embodiments and Examples

In one example, a system 500 can include a computer 572 including a processor 575 and a computer readable storage medium 573 where an application or one or more programs 574 can be stored which can in one example, embody all or part of the method of the present disclosure. The application can include all or part of instructions to implement the method of the present disclosure, embodied in code and stored on a computer readable storage medium. The computer and/or device can include a display. The computer 572 can operate, in all or in part, in conjunction with other devices or a remote server by way of a communications network 560, for example, the Internet.

Additional Examples and Embodiments

Referring to the figures, and for example, FIG. 3, a system 500 includes a computer 512 which can be integral to or communicating with a device, and communicate with other computers such as computer 572 of the control system 570. A computer 572 remote from the device can electronically communicate, in all or in part, with a control system computer 572 as part of a control system 570. The control system can include the computer 572 having a computer readable storage medium 573 which can store one or more programs 574, and a processor 575 for executing program instructions, and can also include control software 578 for managing the one or more programs. The computer 572 can communicate with a database 576, which can for example, store all or part of data.

The control system can also communicate with a computer system 590 which can include a learning engine/module 592 and a knowledge corpus or database 596. The computer system 590 can also communicate with the computer 572. In another example, the computer system 590 can be all or part of the control system, or all or part of a device. The depiction of the computer system 590 as well as the other components of the system 500 are shown as one example according to the present disclosure. One or more computer systems can communicate with a communications network 160, e.g., the Internet.

In one example, an AI (Artificial Intelligence) ecosystem, or technology/communication or IT (Information Technology) ecosystem can include a local communications network which can communicate with the communications network 560. The system 500 can include a learning engine/module 592, which can be at least part of the control system or communicating with the control system, for generating a model 593 or learning model. In one example, the learning model can model workflow in a new AI or IoT (Internet of Things) ecosystem for machine/devices in the new ecosystem.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

It is understood that a user device is representative of devices, which can include, mobile devices, smart devices, laptop computers etc.

More Examples and Embodiments

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Additional Embodiments and Examples

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 5, a computing environment 1000 contains an example of an environment for the execution of at least some of the computer code involved in performing the inventive methods, such as controlling or managing an extraction of an electronic connector from an electronic circuit board 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment

1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. An apparatus for a controlled extraction of an electronic connector from an electronic circuit board, comprising:

a device including a press mechanism being positionable in spaced relation to a base fixture of the device and being couplable to the base fixture, the base fixture having a location to couple an electronic circuit board, the electronic circuit board including a connector removable coupled to the electronic circuit board, the connector having a series of openings for receiving electrical connecting pins, the base fixture of the device being couplable to a tabletop surface;

the press mechanism having a removal tool being couplable to the base fixture, and the removal tool being in spaced relation to the connector, the removal tool having elongated shafts being alignable for insertion into the series of openings in the connector, respectively, the shafts being insertable into the series of openings in response to applying a downward force to the removal tool; and capturing elements on the shafts being actuable to removably couple the capturing elements to a wall defining the openings of a plurality of the series of openings while removably coupling the removal tool to the base fixture, to remove the connector from the electronic circuit board in response to applying an upward force to the removal tool.

2. The apparatus of claim 1, wherein the capturing elements are actuable using a press mechanism positioned above the removal tool and contactable with the removal tool to actuate the capturing elements.

* * * * *